L. Lillie,
Permutation Lock.
No. 2,233. Reissued Apr. 24, 1866.
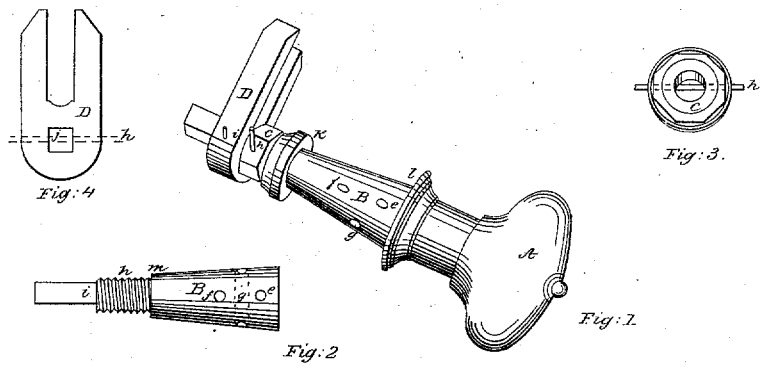
Witnesses:
Marcus P. Norton
Edw. F. Brown
Inventor
Lewis Lillie
AM. PHOTO-LITHO. CO. N.Y. (OSBORNE'S PROCESS.)

UNITED STATES PATENT OFFICE.

LEWIS LILLIE, OF TROY, NEW YORK.

IMPROVEMENT IN BANK AND SAFE DOOR KNOBS.

Specification forming part of Letters Patent No. 24,647, dated July 5, 1859; Reissue No. 2,233, dated April 24, 1866.

*To all whom it may concern:*

Be it known that I, LEWIS LILLIE, of the city of Troy, county of Rensselaer, and State of New York, have invented new and useful improvements in safe, bank-vault, or other iron door knob spindles, containing a tapering or conical shape, and which I hereby denominate a "Tapering or Conical Knob or Lock Spindle," upon which Letters Patent of the United States were duly granted and delivered to me on or about the 5th day of July, A. D. 1859; and I do hereby declare that the following is a full, clear, and exact description of the nature, construction, and operation of the same, reference being hereby had to the accompanying drawings, and to the letters of reference marked thereon, making a part of this specification.

Like letters represent and refer to like or corresponding parts.

Figure 1 is a perspective view of the said tapering or conical knob or lock spindle, having a knob attached thereto, and each more fully described hereinafter. Fig. 2 represents the said tapering or conical spindle without any knob or lock attached thereto. Fig. 3 shows the nut, and Fig. 4 represents the switch-bar, each of which is more fully hereinafter described and set forth. Figs. 5 and 7 show the said tapering or conical spindle attached to the back plate of a safe or vault door lock, with the knob thereto attached and ready for use, in the manner substantially as herein described and set forth. Fig. 6 represents a vertical section, and showing said tapering or conical spindle in the door of a safe or vault, and combined with the lock upon the inner side thereof, in the manner and for the purposes substantially as herein described and set forth. Fig. 8 represents also a vertical section, and showing the said tapering or conical spindle in the door of a safe or vault, and combined with the lock-case upon the inner side of the said door, in the manner substantially as hereinafter described and set forth.

The nature of my said invention and improvements consists in the employment of a tapering or conical spindle, which shall be in diameter greater at that end on which is placed the knob than the end on which is securely fastened a lock or lock-bolt switch or bar, and the same passing entirely through the thickness of the said door, from outside to inside thereof, in such tapering or conical form so that it cannot be driven through such door into the safe or vault to which such door belongs, and by means thereof force off and from such door the lock or lock switch or bar by which the said door had been securely fastened or locked. The said tapering or conical spindle being securely fastened upon the inner side of the said safe or vault and to the lock or lock-switch bolt in the manner hereinafter described and set forth, it cannot be drawn out or from the said door by any means applied thereto while the said door is locked in its place in such safe or vault or elsewhere, and therefore no entrance can be obtained to the lock or switch bar or bolt by which such door is fastened in its place against burglars, for the purpose of forcing the same from their mechanical fastenings, and by such means gain burglarious entrance into such safe or vault. The bolt or shaft which operates the lock machinery from the outside of the said door of such safe or vault may pass through the center of said tapering or conical spindle in the manner substantially as shown at Figs. 6 and 7, and more fully described and set forth hereinafter.

Having thus described the nature of my said invention, and in order to enable those skilled in the art to make and use the same, I will here proceed to describe the construction and operation of the same, which is as follows, to wit:

A, Figs. 1, 5, 6, 7, and 8, represents the said knob, and it may be of any size or form or of any material which will answer the purposes required, and it must be firmly fastened to the larger end of the said spindle B in any manner or by any mechanical means deemed best.

B, Figs. 1, 2, 5, 6, 7, and 8, is the conical or tapering spindle, and it may be made of iron or steel. When made of wrought-iron, I usually put through the same the steel pins *f*, *g*, and *e*, Figs. 1 and 2, in the manner substantially as there shown, which are for the purpose of preventing the drilling through, or out the said spindle B. When said spindle B is made of cast or other steel, there will be no use for or necessity of the employment of said steel pins for said purpose, and I much prefer the same to be made of the best kind of steel and hardened. It must be constructed in an even taper from the outside or larger end, to which said knob A is fastened, or substantially so, and unto the inner or smaller end, to which the nut C, switch D, or to the lock-case *c* of the lock F is connected, and combined in the manner substantially as hereinafter described and set forth.

The distance between *k* and *l*, Fig. 1, represents the thickness of the door of the safe or vault E, Figs. 6 and 8, or other door to which the same may be applied in the manner herein described and set forth. The hole through the said doors made to receive the aforesaid tapering or conical spindle must be in a conical or tapering form or shape to correspond to and exactly fit the form or shape of the said spindle B. The said spindle is passed through any door, from the outside thereof to the inside of the same, and is then and there securely fastened or held by means of the said nut C, or lock or lock-case *c*, substantially as seen at Figs. 2 6, and 8 of the accompanying drawings, or in any other manner which will answer the purposes required. If held by said nut, it will be turned up to and firmly against the shoulder or support *m m*, Fig. 2, or if held by means of the said lock, or lock-case *c* of the lock F it will be by the employment of male and female screws, substantially as seen at *a* and *b*, Figs. 6 and 8; or it may be held connected and combined with the said switch bar or bolt or lock or lock-case, as aforesaid, by any mechanical means which will answer the required end or purpose. To prevent the aforesaid spindle from becoming loose or disconnected from the said switch or lock or lock-case, I generally use a pin, as seen at *h*, Figs. 1, 3, and; 4 or it may be secured by other mechanical means which will not allow the said screws to be separated. The said switch D is for the purpose of moving bolts or bars within the door into and from and out of the jamb of the door of the safe, vault, or other door where my said invention can or may be used, so as to secure the door thereof preparatory to the operation of moving the fastening-bolt of the lock in any of the aforesaid doors. The said switch is securely fastened in its proper place by any good and sufficient mechanical means. *j*, Fig. 4, is a mortise, to receive the central shaft by means of which the said switch or lock bolt or machinery of the lock is operated. The length of said tapering or conical spindle B will somewhat depend upon the thickness of said door E, Figs. 6 and 8.

*c c*, Figs. 6 and 8, represent the thickness of and back plate of the said lock or lock-case to which the said tapering or conical spindle B is combined and secured, as aforesaid. The main object in the constructing the said spindle B in a tapering or conical form, as herein described and set forth, is to prevent the driving in or out from the door of any safe, vault, or other structure the aforesaid spindle, so combined with such lock, lock-case, or switch, and thus and thereby prevent any entrance into the inner side of such door or lock, so as to admit or allow of the reception of gunpowder or other explosive material by which it would be proposed and an effort made to destroy the said door or lock by breaking either or both into parts or pieces, and thus and by such means effect an entrance into such safe, vault, or other structure in such manner by any burglars.

*e*, *f*, and *g*, Figs. 1 and 2, represent cast-steel pins, driven firmly into and through the wrought-iron knob bolt or spindle hereinbefore described, which cast-steel pins are so inserted for the purpose of preventing the possibility of any burglar drilling through the said bolt or spindle B, and thereby effecting an entrance into the inside of the door, so that the said burglar can or may thereby and therein insert gunpowder or other explosive material, in the manner and for the purposes subtantially as aforesaid. Whenever said spindle B is made from cast-steel, then there will be no use for the said steel pins, and the same, of course, may therefore be omitted. In either case the tapering or conical construction of said spindle will be the same, and the purposes of the invention will be substantially the same. It is manifest, therefore, that the said tapering or conical spindle cannot be pulled out or driven from any door to which the same is attached or combined, for the purposes substantially as aforesaid, by any burglar or other person. Said tapering or conical construction of the said spindle B will prevent it from being forced into the safe, vault, or other structure, and out of and from the door thereof, or forced from such door, by means thereof, the lock or lock case or switch-bar, as aforesaid, and the mechanical fastenings thereof upon the inner side of such door, so as thereby to gain entrance within such structures, as herein described; and the said doors being so secured in their respective and proper place by the means substantially as aforesaid, the said spindle B cannot be drawn out or from the said safe, vault, or other door by any burglar or other person who may desire to gain an entrance into such safe, vault, or other structure for robbery. The said conical or tapering spindle, when made entirely of cast-steel and properly hardened, cannot be drilled out from said safe, vault, or other door by any tools or other means usually used by burglars. It is therefore especially designed to give greater security to any door of safes, vaults, or other structures against any burglarious entrance thereto, in the manner substantially as aforesaid.

My said invention, hereinbefore described, may also be attached to any door or elsewhere for the purposes herein described, and it is specially designed to give greater security to any door against any burglarious entrance, in the manner as aforesaid, to any bank, safe, building, or elsewhere to which it can or may be applied, as and in the manner hereinbefore specified.

Having thus described my said invention, its nature, construction, and main purposes thereof, what I claim, and desire to secure by Letters Patent of the United States, is—

1. The employment of the switch or bar D and the nut C, or any equivalent thereof, arranged upon and combined with the knob bolt or spindle B, in the manner substantially as and for the purposes herein described and set forth.

2. The tapering or conical spindle B, in combination with a door of an iron or metallic safe, vault, or other structure, so as to prevent the lock or lock-bolt switch, by which the door thereof is fastened therein, from being driven from such door from the outside of the same by any burglar, in the manner substantially as herein described and set forth.

3. The employment of said tapering or conical spindle B, in combination with the lock-case *c* of the lock F, or any equivalent thereof, in the manner and for the purposes substantially as herein described and set forth.

4. The employment of the tapering or conical spindle B, or any equivalent thereof, when used in the manner and for the purposes substantially as herein described and set forth.

In testimony whereof I have, on this 15th day of July, A. D. 1865, hereunto set my hand.

LEWIS LILLIE.

In presence of—
MARCUS P. NORTON,
CHARLES D. KELLUM.